(No Model.) 2 Sheets—Sheet 1.
S. HIRSCHLER.
SPREADER AND DISCHARGER FOR MALT KILNS.
No. 432,706. Patented July 22, 1890.
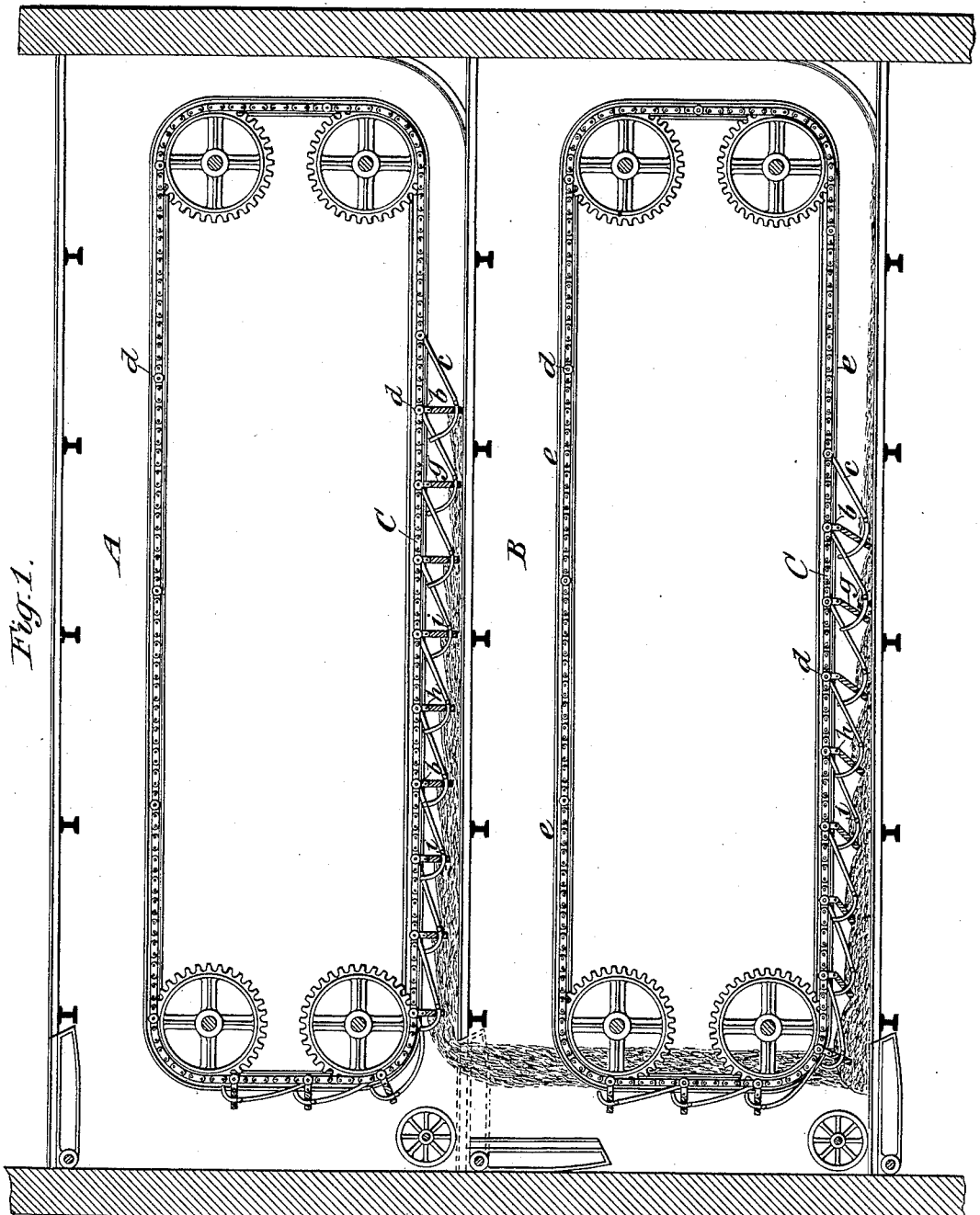

(No Model.) 2 Sheets—Sheet 2.
S. HIRSCHLER.
SPREADER AND DISCHARGER FOR MALT KILNS.
No. 432,706. Patented July 22, 1890.
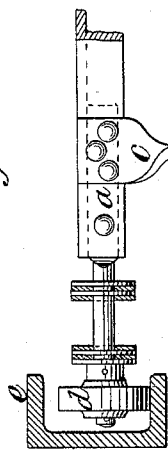
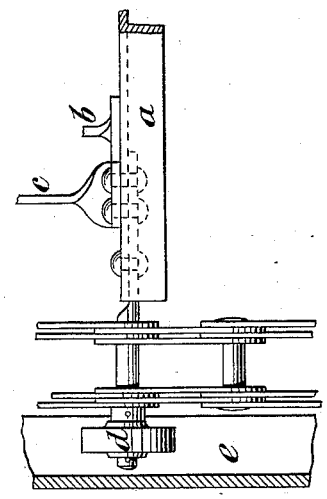
Witnesses:
Inventor:
Siegfried Hirschler
By attorneys
Brown & Griswold

UNITED STATES PATENT OFFICE.

SIEGFRIED HIRSCHLER, OF WORMS, GERMANY.

SPREADER AND DISCHARGER FOR MALT-KILNS.

SPECIFICATION forming part of Letters Patent No. 432,706, dated July 22, 1890.

Application filed September 28, 1889. Serial No. 325,350. (No model.)

*To all whom it may concern:*

Be it known that I, SIEGFRIED HIRSCHLER, a subject of the Emperor of Germany, and a resident of Worms, Germany, have invented new and useful Improvements in Apparatus for Spreading Grain Over and Removing it from the Floors of Malt-Kilns, of which the following is a specification.

This invention relates to improvements in the apparatus for removing grain and other substances from malt-kilns, granaries, and like places, forming the subject of my United States patent, No. 417,825, dated December 24, 1889, the object of the present invention being to construct the said apparatus so that it will serve to spread the grain evenly over the floor, as well as to clear it therefrom.

In the accompanying drawings, Figure 1 is a section of two superposed floors of a malt-kiln fitted with my improved apparatus for spreading grain over the floors and for removing it therefrom. Figs. 2 and 3 are respectively a vertical section and a horizontal section, drawn to an enlarged scale, illustrating a portion of my improvements.

Similar letters in all the figures indicate similar parts.

The apparatus comprises two endless chains or bands running over chain-wheels and serving to carry various-sized boards or scrapers, as in the specification of the said former patent.

According to my present invention I attach angle-iron scraper-carrying bars *a* between the chains or bands C at certain distances apart, where the boards or scrapers *g* are to be secured, the said bars having flat iron projections *b* fixed to them to carry the boards or scrapers *g*, which are hinged thereto at *h* and guided by bars or guides *c*, which are attached to the angle-iron bars *a*.

When clearing out the grain or other substance, it is necessary to keep the boards or scrapers *g* rigidly in a vertical position. This I do by means of stop-bars *i*, placed parallel with the scrapers between the guides *c*, and thereby attached to the scraper-carrying bars *a*, the stop-bar for one scraper being attached to the carrying-bar of the next one. The scrapers when running in the direction for clearing the grain then bear against these bars. After one story or floor A of the drying-house has been cleared and the material conducted into the next lower story B it is spread out evenly on the floor by a similar apparatus, which is caused to work in an opposite direction to that taken when clearing the floor A. The trap-doors are all located on one side, (the left-hand side, for example, as shown in the drawings,) and consequently the chain-wheels must revolve in one direction to clear the material out and in the opposite direction for spreading the material. When running in the direction for spreading the material, the boards or scrapers *g* do not rest on the bars *i*, and take a more or less inclined position, according to the resistance of the material to be spread. Consequently the scrapers only carry along a small quantity of the material at a time, till it becomes gradually spread evenly all over the floor. The clearing is afterward effected by simply reversing the direction of motion of the chains or bands. The scrapers are guided by rollers or wheels *d*, running in channel-irons *e*, as shown in the detail views, Figs. 2 and 3.

Having now particularly described and ascertained the nature of the said invention and in what manner the same is to be performed, I declare that what I claim is—

The combination, with the endless chains or bands C, of the cross-bars *a*, carried by said chains and having projections *b*, the boards or scrapers *g*, hinged to the said projections, the bars or guides *c*, secured to said bars *a*, and the stop-bars *i*, placed parallel with the scrapers between the guides *c*, substantially as and for the purpose herein set forth.

In testimony whereof I have signed my name to this specification in the presence of two subscribing witnesses.

SIEGFRIED HIRSCHLER.

Witnesses:
 FRANZ HASSLACHER,
 RICHARD WIRTH.